Patented Sept. 12, 1922.

1,428,910

UNITED STATES PATENT OFFICE.

IVAR RENNERFELT, OF DJURSHOLM, SWEDEN.

METHOD OF OPERATING ELECTRIC FURNACES.

No Drawing.  Application filed August 12, 1921. Serial No. 491,837.

(GRANTED UNDER THE PROVISIONS OF THE ACT OF MARCH 3, 1921, 41 STAT. L., 1313.)

*To all whom it may concern:*

Be it known that I, IVAR RENNERFELT, a citizen of the Kingdom of Sweden, and resident of Djursholm, in the county of Stockholms Lan and Kingdom of Sweden, have invented a new and useful Method of Operating Electric Furnaces (for which I have filed an application in Sweden December 4th, 1914, Patent No. 41217), of which the following is a specification.

My invention relates to the method of converting energy into heat by means of electric arcs and has for its object to facilitate the employment of said method in connection with electric furnaces, which are to be used preferably for melting and refining metals.

According to my method a plurality of arcgenerating, adjustable electrodes are provided in a furnaceroom, being so arranged that arcs may be caused to burn either between the tips of the electrodes or between the electrodes and a charge underneath the electrodes.

My invention consists, furthermore and principally, in providing means for supplying either twophase—or threephase current to said electrodes. This may be obtained by providing two separate transformers, one for delivering twophase current and another for delivering threephase current to the furnace, and also suitable switching device in combination with the two transformers. It is possible also to employ for the same purpose one single transformer, consisting of two separate singlephase units, which may be connected together either according to the wellknown "Scott system" or according to what is called "open delta" connection. The former connection is used for delivering twophase current; the latter for delivering threephase current.

Several advantages are secured by operating an arcfurnace with both twophase and threephase current. In the case of melting a cold charge the use of twophase current simplifies the regulation of the input of energy, as only two electrodes will have to be regulated in case the electrodes are arranged as disclosed for instance in U. S. Patent 1,103,379. The threephase current is to be used for generating arcs, preferably but not always, in contact with the charge, the number of arcs being equal to the number of electrodes. Consequently, if a furnace is provided with three electrodes according to the patent cited above, three arcs will be available for refining a liquid charge if using threephase current, whereas only two arcs would be available, if using twophase current all the time. It is to be noted that twophase arcs in contact with the charge may be used in such a case only, if the electrode connected to the common terminal of the secondary transformerwinding, is shortcircuited with the charge. This, however, will sometimes cause difficulties by the charge absorbing carbon from the electrode, which is in immediate contact.

The use of threephase current for refining a charge, which has been previously melted by means of twophase current reburning arcs, will cause a vigorous stirring of the surface layers of the charge greatly facilitating several of the reactions required for refinding a charge of steel. It is possible to move the tips of the electrodes with relation to each other, in this way altering not only the intensity of heating at the central part of the charge but also the resistance to the flow of the electric current between any two of the electrodes.

It obviously is a considerable advantage to be able to distribute the heat by means of at least three separate arcs instead of heating the furnace all the time with a twophase arc, concentrated at the central part of the charge and burning freely above the surface.

I do not mean, however, that the furnace should be operated with threephase arcs in contact with the charge all the time after a cold charge has been melted, as it may be advisable for obtaining a minimum of slag inclusions to let the steelbath remain in quietness for a considerable "killing" time, being heated by means of freeburning arcs, which have no tendency to cause undesirable whirling motions in the bath. For killing the steel freeburning arcs may be used without changing back from threephase current supply to twophase current supply. This may even be advisable as a lower voltage may very conveniently be obtained from a transformer, built to supply either twophase or threephase current. The use of a lower voltage is to be preferred during the finishing of the charge as this will facilitate the prevention of too high a temperature being used.

I do not want to limit myself to any specific method of obtaining alternatingly twophase or threephase current as this may be done in any preferred way. I also do not limit myself to the use of any certain number of electrodes as evidently a multiple of three electrodes arranged in sets of three electrodes each may be provided especially in large furnaces.

Having now fully described my invention, I claim and desire to secure by Letters Patent of the United States:

1. The method of operating an electric arc furnace consisting in first supplying to the electrodes twophase current and then supplying threephase current.

2. The method of operating an electric arc furnace consisting in first supplying twophase current and then supplying threephase current employing arcs in contact with the charge.

3. The method of operating an electric furnace consisting in supplying first twophase current heating a charge by means of freeburning arcs and then supplying threephase current heating the charge by means of arcs in contact with the surface of the charge and changing the relative distance between the arcs.

Signed at Stockholm in the county of Stockholms Lan and State of Sweden this 30. day of July A. D. 1921.

IVAR RENNERFELT.

Witnesses:
S. IVERSON,
HAMPTON BONNER.